United States Patent [19]

Sikora

[11] Patent Number: 4,805,077

[45] Date of Patent: Feb. 14, 1989

[54] LIGHTING FIXTURE HAVING A SEALED, WEATHERPROOF SECONDARY COVER

[75] Inventor: Thomas R. Sikora, Mesa, Ariz.

[73] Assignee: Tomar Electronics, Inc., Tempe, Ariz.

[21] Appl. No.: 139,281

[22] Filed: Dec. 29, 1987

[51] Int. Cl.$^4$ .............................................. F21V 31/02
[52] U.S. Cl. ................................. 362/267; 362/268; 362/363
[58] Field of Search ................ 362/74, 158, 267, 268, 362/339, 363, 101; 285/918

[56] References Cited

U.S. PATENT DOCUMENTS

| | | | |
|---|---|---|---|
| 1,906,181 | 10/1933 | Smally | 362/363 X |
| 2,773,171 | 12/1956 | Pennow | 362/363 X |
| 3,221,162 | 11/1965 | Heenan et al. | 362/268 |
| 3,253,138 | 5/1966 | Nagel | 362/268 |
| 3,271,735 | 9/1966 | Gosswiller | 362/74 X |
| 4,142,179 | 2/1979 | Lowndes | 362/267 X |
| 4,215,390 | 7/1980 | Brandt | 362/363 X |
| 4,290,098 | 9/1981 | Pierson | 362/267 |
| 4,564,890 | 1/1986 | Poyner | 362/363 X |
| 4,638,411 | 1/1987 | Trainor | 362/363 X |

OTHER PUBLICATIONS

Austin Electronics, Inc. brochure, Printed in U.S.A. Form No. 0386-XVM (C818OH), 1986.

Primary Examiner—Ira S. Lazarus
Assistant Examiner—R. R. Cole
Attorney, Agent, or Firm—Cahill, Sutton & Thomas

[57] ABSTRACT

A light source is positioned within a substantially cylindrical, optically transparent enclosure having a load supporting base. The exterior surface of the enclosure includes a light converging lens having a plurality of jagged edges subject to contamination by dirt and moisture. An optically transmissive, substantially cylindrical secondary cover having a smooth exterior surface is coaxially fitted over the first enclosure to protect the jagged elements of the enclosure lens from contamination by dirt or moisture. An hermetic seal is formed between the lower, outer surface of the lens and the lower, inner surface of the secondary cover to prevent introduction of either dirt or moisture into the chamber formed between the exterior of the lens and the interior of the secondary cover.

23 Claims, 2 Drawing Sheets

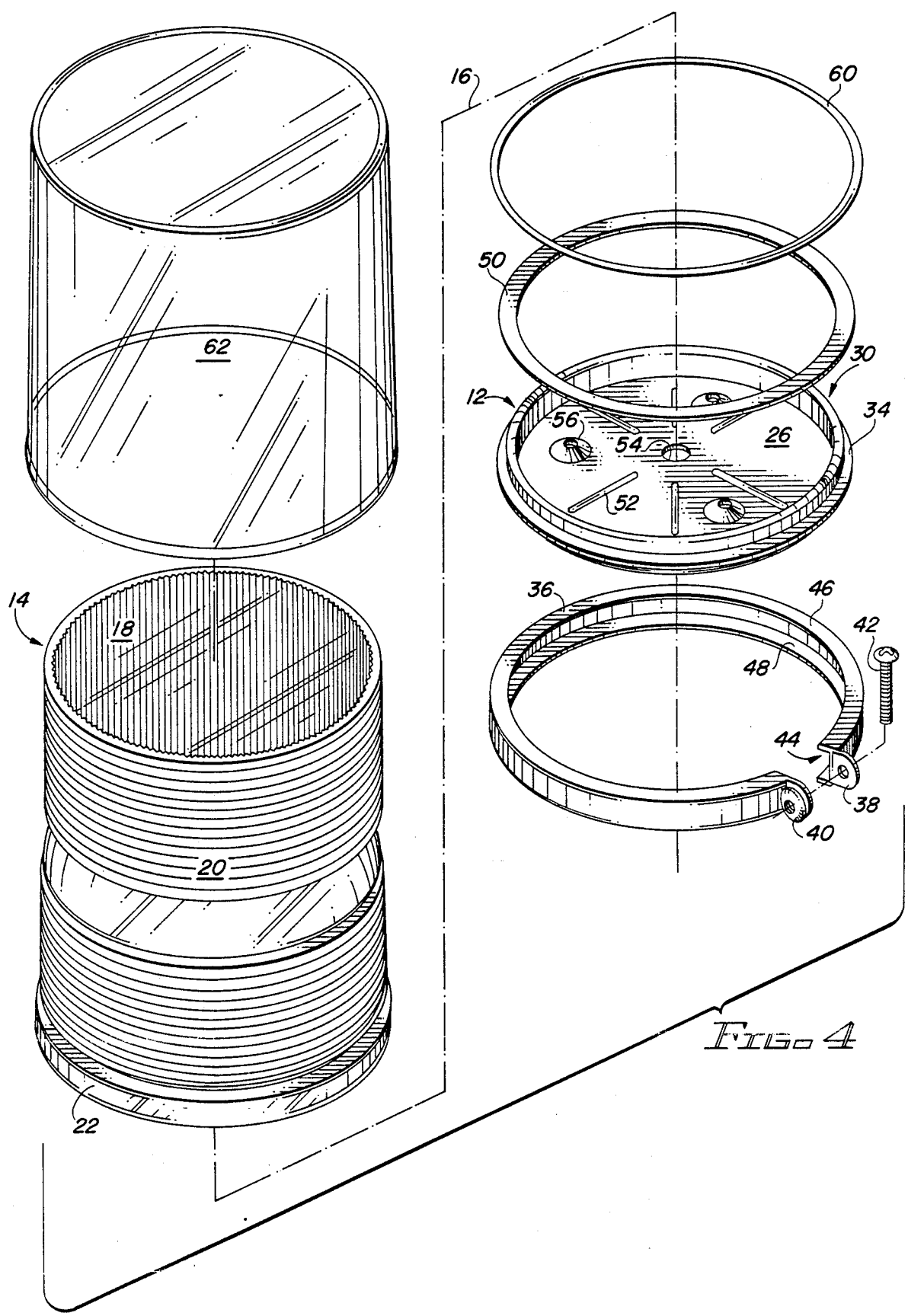

LIGHTING FIXTURE HAVING A SEALED, WEATHERPROOF SECONDARY COVER

BACKGROUND OF THE INVENTION

This invention relates to weatherproof lighting fixtures, and more particularly, to weatherproof lighting fixtures having optically transmissive, jagged edged lens elements with coaxially fitted, smooth-surfaced protective covers.

DESCRIPTION OF THE PRIOR ART

Outdoor lighting fixtures of the type typically used to provide a weatherproof environment for an electronically operated strobe light include an optically transmissive enclosure in combination with a load bearing base. In order to focus or converge the output beam from the lighting source, a Fresnel lens including a plurality of angled, faceted surfaces is formed in the exterior surface of the light fixture enclosure. A variety of other multi-element converging lenses may also be utilized to accomplish the same light converging purpose.

Since weatherproof light fixtures of this type are frequently attached to police cars, fire engines or ambulances or are secured to the exterior of buildings or used for other outdoor applications, the multi-element lens systems of these lighting fixtures become contaminated with dirt or moisture which substantially degrades the optical performance of the lens elements.

In addition, particularly on vehicular applications, weatherproof strobe lighting fixtures must withstand vehicle cleaning activities involving use of automated vehicle washing systems or high pressure spray cleaning systems.

In order to prevent water-induced short circuiting of the electrical components of high voltage strobe power supplies typically housed within such lighting fixtures, it is important that all physical joints between the component parts of such lighting fixtures be hermetically sealed.

SUMMARY OF THE INVENTION

It is therefore a primary object of the present invention to provide a weatherproof lighting fixture having an hermetically smooth-surfaced secondary cover for a cylindrical lens system including a plurality of jagged edges on the exterior surfaces thereof.

Another object of the present invention to provide a weatherproof lighting fixture having a coaxially fitted, hermetically sealed, secondary cover with a smooth exterior surface which can be readily cleaned.

Another object of the present invention is to provide a weatherproof lighting fixture which forms an O-ring seal between the lens system and secondary cover to hermetically seal the secondary cover to the lighting fixture.

Briefly stated, an in accord with one embodiment of the invention, a weatherproof cover for a lighting fixture includes a light source coupled to a supporting base having a substantially cylindrical flange. An optically transmissive, substantially cylindrical enclosure for the light source includes a longitudinal axis, a closed upper surface, a body having an exterior surface, a substantially cylindrical base dimensioned to interface with the flange of the supporting base, a sealing section positioned adjacent to the base and including a cylindrical groove having a grooved surface and a lens formed in the exterior surface of the body and including a plurality of non-linear lens elements. A compressible, O-ring sealing device is dimensioned to fit into and form a seal with the grooved surface in the sealing section of the enclosure. A substantially cylindrical, optically transmissive cover for the light source enclosure includes an interior surface and is dimensioned to fit coaxially over the enclosure. A chamber is defined between the exterior surface of the enclosure and the interior surface of the cover. The cover further includes a longitudinal axis coincident with the longitudinal axis of the enclosure and a lower section configured to overlie the lower section of the enclosure with an inner surface which engages the sealing means and which creates a seal between the lower section of the enclosure and the lower section of the cover. This seal prevents the introduction of dirt or moisture into the chamber formed between the enclosure and the cover.

DESCRIPTION OF THE DRAWINGS

The invention is pointed out with particularity in the appended claims. However, other objects and advantages together with the operation of the invention may be better understood by reference to the following detailed description taken in conjunction with the following illustrations, wherein:

FIG. 4 is an exploded perspective view illustrating the manner in which the component parts of the lighting fixture interface with one another.

DETAILED DESCRIPTION OF THE INVENTION

Figure 1:
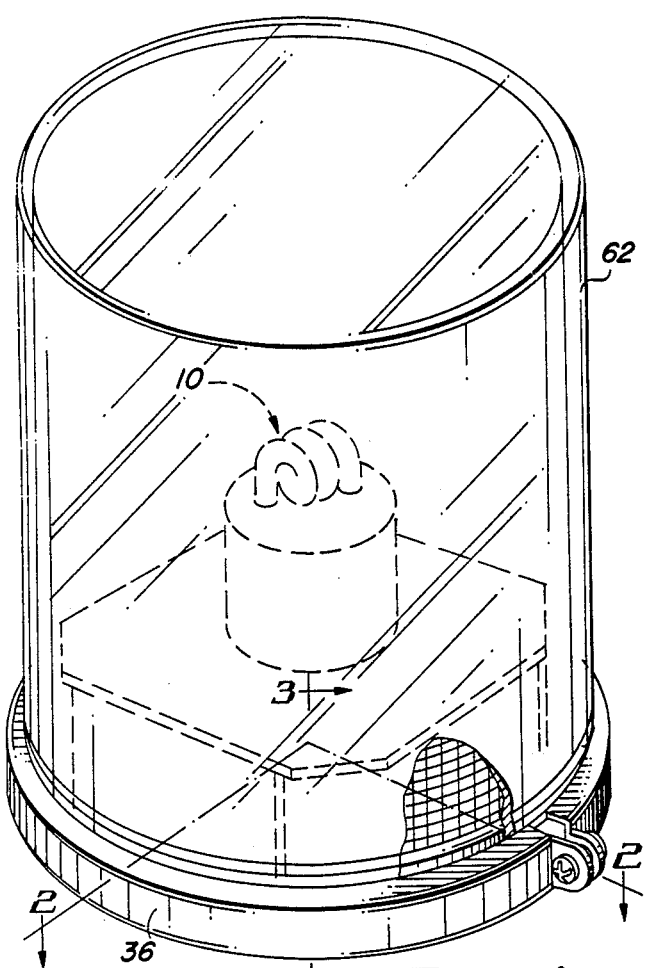
FIG. 1 is a perspective view of the lighting fixture of the present invention.

In order to better illustrate the advantages of the invention and its contributions to the art, the various mechanical features of a preferred embodiment of the invention will now be reviewed in detail.

A light source 10 is physically coupled to a supporting base 12 fabricated from stainless steel formed into the depicted shape by a single stamping operation.

As illustrated in FIG. 4, an optically transmissive, substantially cylindrical enclosure 14 is symmetrically oriented with respect to a longitudinal axis 16 and includes a closed upper surface 18 which is centered about longitudinal axis 16.

Figure 3:
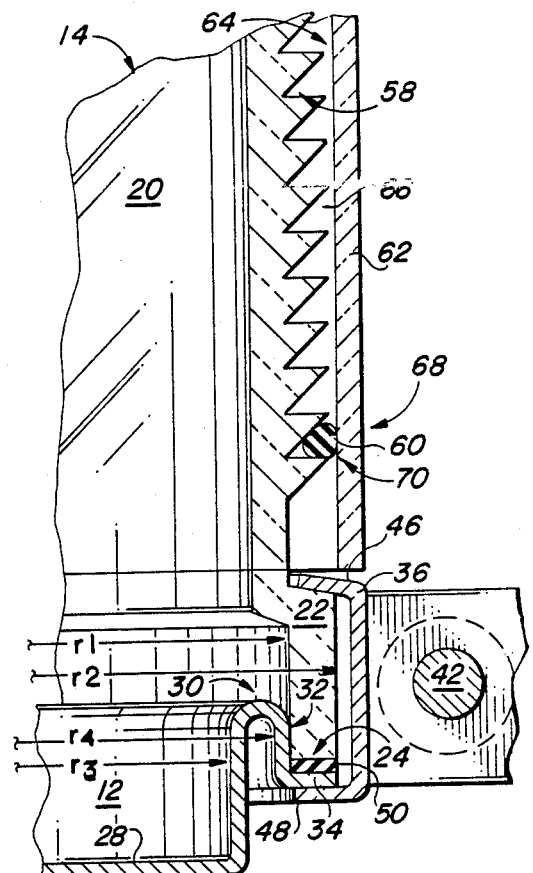
FIG. 3 is a partially cut away sectional view of the lighting fixture illustrated in FIG. 1, taken along section lines 3—3.

Enclosure 14 further includes a body 20 which is centered about longitudinal 16 and which extends downward from upper surface 18. As illustrated in FIG. 3, the body 20 of enclosure 14 includes a lower section generally designated by reference number 22 which includes a substantially flat lower surface 24 which is oriented perpendicular to longitudinal axis 16. Lower surface 24 commences at a first radial distance r1 from axis 16 and terminates at a second radial distance r2 from axis 16.

Figure 2:
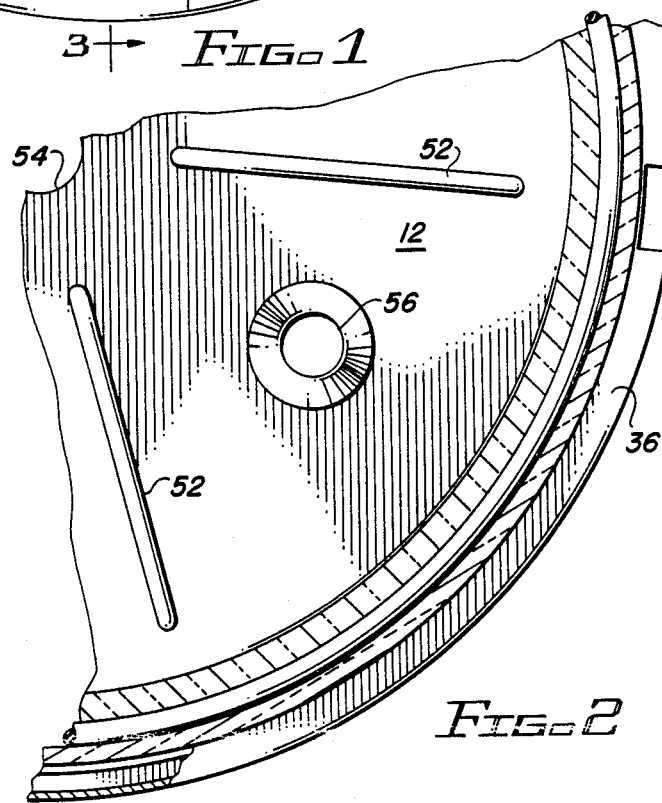
FIG. 2 is a partially cut away elevational view of the lighting fixture depicted in FIG. 1, taken along section lines 2—2.

As illustrated in FIGS. 2 and 4, base 12 is formed in a circular configuration and includes a circular disc section 26 centered about axis 16 which includes an upper surface 28 and which terminates at a third radial distance r3 from axis 16.

As illustrated in FIGS. 3 and 4, vertically oriented, circular first flange section 30 is centered about longitudinal axis 16 and coupled to disc section 26. First flange section 30 includes a vertically oriented, outer surface 32 which is located at a fourth radial distance r4 from longitudinal axis 16. Radial distance r4 is approximately equal to or slightly shorter than radial distance r1 and enables first flange section 30 to fit coaxially within lower section 22 of body 20. The U-shaped, curved space between the inner wall of first flange section 30 at radial distance r3 and its outer wall at radial distance r4 defines a horseshoe bend in the single piece steel base 12.

A horizontally oriented, circular second flange section 34 is coupled to and extends outward from first flange section 30 and includes an upper surface for contacting the lower surface 24 of enclosure 14. Second flange section 34 is positioned at a horizontal elevation above disc section 26 and below the upper extremity of the horseshoe bend in first flange section 30.

Clamping means in the form of an open circle, C-shaped steel clamp 36 includes a first end 38 and a second end 40. End 40 includes a threaded aperture for receiving machine screw 42 which serves to vary the spacing between ends 38 and 40 to control the clamping forces exerted by clamp 36. As illustrated in FIG. 4 by reference number 44, clamp 36 includes a C-shaped cross section having an upper clamping surface 46 and a lower clamping surface 48. Upper clamping surface 46 engages a matching, inclined surface disposed on the upper part of lower section 22 of body 20 while lower clamping surface 48 engages the lower surface of second flange section 34.

A circular rubber or neoprene gasket 50 is disposed between lower surface 24 and second flange section 34 to form a water impervious seal between base 12 and enclosure 14.

A plurality of ribs 52 are radially disposed about the surface of disc section 26 to reinforce and rigidize that section of base 12. A circular aperture 54 is disposed in the center of disc section 26 to enable electrical interconnecting cables to pass into the interior of the lighting fixture and to be coupled to light source 10. A plurality of upwardly dished apertures 56 are also disposed in disc section 26 to enable the light fixture to be mechanically secured to a solid body. Neoprene grommets, gaskets or equivalent sealant materials will typically be disposed in upwardly dished recesses surrounding dished apertures 56 in order to maintain the watertight seal between the interior and exterior of the lighting fixture.

Body 20 is typically fabricated from optically transmissive glass or plastic having either transparent or optically tinted color characteristics. A Fresnel or equivalent light collimating lens is formed in the exterior surface of body 22 and includes a plurality of nonlinear lens elements 58. In the embodiment depicted in FIG. 3, lens elements 58 take the form of a series of lens facets of alternating, but repetitive inclination angles.

In one embodiment of the invention, compressible, O-ring sealing means 60 is dimensioned to fit into and form a seal with a grooved surface disposed at a location at or below the lowermost extremity of lens elements 58. In one embodiment of the invention, O-ring sealing means 60 can be fitted into the circular, grooved surface defined by adjacent, inclined facets of lens elements 58. In another embodiment of the invention not shown in the drawings, a special circular grooved surface having either a smooth U-shaped contour or inclined, faceted surfaces of the type depicted in FIG. 3 could be located below lens elements 58 to receive O-ring sealing means 60.

A substantially cylindrical, optically transmissive cover 62 includes an interior surface 64 dimensioned to fit coaxially over enclosure 14. The coaxial fit between the interior surface 64 of cover 62 and the outer lens surface of enclosure 14 defines a chamber 66 between enclosure 14 and cover 62.

As illustrated in FIG. 3, the lower section of cover 62 generally designated by reference number 68 is dimensioned to overlie the lower section of enclosure 14 where O-ring sealing means 60 is disposed. The inner surface 70 of cover 62 is dimensioned to engage and be compressed against O-ring sealing means 60 to create a weatherproof seal between the outer surface of enclosure 14 and the corresponding inner surface of cover 62 to prevent the introduction of dirt or moisture into the chamber The lower section 68 of cover 62 extends beyond and below O-ring sealing means 60 to form an unsealed secondary chamber between enclosure 14 and cover 62.

As a result of the unique structure of the lighting fixture of the present invention, the interference fit between the vertically oriented, outer wall of first flange section 30 of base 12 and the vertically oriented inner wall of lower section 22 of enclosure 14 creates a self-alignment feature between base 12 and enclosure 14 and facilitates the rapid, accurate installation of base 12 to enclosure 14 while maintaining precise mechanical alignment between lower surface 24 of body 20, second flange section 32 and sealing gasket 50. This self-aligning feature ensures the creation of a highly reliable, hermetic seal between base 12 and enclosure 14.

The unique structure of the seal created by the compressive, interference fit between O-ring sealing means 60, the lens elements 58 of enclosure 14 and the inner wall 64 of transparent plastic cover 62 not only provides a weathertight hermetic seal at the lower extremity of chamber 66, but also provides a firm mechanical coupling between enclosure 14 and cover 62 which by itself secures cover 62 to enclosure 14. The unique configuration of this aspect of the invention also permits existing lighting fixtures incorporating only an enclosure 14 with lens elements 58 to be readily converted to a weatherproof lighting fixture having a cover 62, an O-ring sealing means 60 and an hermetically sealed chamber 66 for preventing dirt and moisture for contaminating and blocking the angled faceted surfaces and grooves defined by the various lens elements 58. The completely smooth exterior surface of cover 62 enables it to be readily cleaned by high pressure washing apparent without permitting the introduction of dirt or moisture into sealed chamber 66.

It will be apparent to those skilled in the art that the disclosed weatherproof lighting fixture may be modified in numerous ways and may assume many embodiments other than the preferred forms specifically set out and described above. Accordingly, it is intended by the appended claims to cover all such modifications of the invention which fall within the true spirit and scope of the invention.

I claim:

1. A weatherproof cover for a lighting fixture comprising:

a. a light source coupled to a supporting base;

b. a substantially cylindrical, optically transmissive enclosure for said light source having
  i. a longitudinal axis;
  ii. a closed upper surface;
  iii. a body having an exterior surface;
  iv. a base dimensioned to interface with said supporting base;
  v. a lens formed in the exterior surface of said body and including a plurality of non-linear lens elements;
  vi. a sealing section positioned above and in proximity to said base and including a cylindrical grooved having a groove surface defined by an adjacent pair of said non-linear lens elements;
c. compressible sealing means dimensioned to fit into and form a seal with said grooved surface; and
d. a substantially cylindrical, optically transmissive cover for said light source enclosure having an interior surface and being dimensioned to fit coaxially over said enclosure, and defining a chamber between the exterior surface of said enclosure and the interior surface of said cover, said cover including
  i. a longitudinal axis coincident with the longitudinal axis of said enclosure; and
  ii. a lower section configured to overlie the lower section of said enclosure with an inner surface for engaging said sealing means and for creating a seal between the lower section of said enclosure and the lower section of said cover to prevent the introduction of dirt or moisture into the chamber between said enclosure and said cover.

2. A weatherproof cover for a lighting fixture comprising:
a. a light source coupled to a supporting base;
b. an optically transmissive enclosure for said light source having
  i. a longitudinal axis;
  ii. a closed upper surface;
  iii. a body having an exterior surface;
  iv. a base dimensioned to interface with said supporting base;
  v. a first sealing section located on the exterior surface of said body, positioned above and in proximity to said base and including a grooved surface;
  vi. a lens formed in the exterior surface of said body and including a plurality of non-linear lens elements;
c. compressible sealing means dimensioned to fit into and form a seal with said grooved surface; and
d. an optically transmissive cover for said light source enclosure having an interior surface, being dimensioned to fit coaxially over said enclosure, and defining a primary chamber between the exterior surface of said enclosure and the interior surface of said cover, said cover including
  i. a longitudinal axis coincident with the longitudinal axis of said enclosure; and
  ii. a lower section configured to overlie the lower section of said enclosure and including a second sealing section located on the interior surface of said cover, for engaging said sealing means and for compressing said sealing means against said first sealing section to create a seal between the first sealing section of said enclosure and the second sealing section of said cover to prevent the introduction of dirt or moisture into the chamber between said enclosure and said cover, the interior surface of said cover extending beyond and below said seal to form an unsealed secondary chamber between said enclosure and said cover.

3. The lighting fixture of claim 2 wherein said enclosure is substantially cylindrical in configuration and wherein said cover is substantially cylindrical in configuration.

4. The lighting fixture of claims 3 or 1 wherein said supporting base includes a substantially circular flange.

5. The lighting fixture of claim 4 wherein the base of said enclosure includes a flange dimensioned to interface with said supporting base.

6. The lighting fixture of claim 3 wherein said grooved surface is defined by an adjacent pair of said non-linear lens elements.

7. The lighting fixture of claims 6 or 1 wherein said sealing means includes an O-ring seal.

8. The lighting fixture of claim 7 wherein the body of said enclosure includes a lower section having a substantially flat lower surface oriented perpendicular to the longitudinal axis, said lower surface commencing at a first radial distance from the longitudinal axis and terminating at a second radial distance from the longitudinal axis.

9. The lighting fixture of claim 8 wherein said base further includes:
  i. a circular disc section centered about the longitudinal axis, having an upper surface and terminating at a third radial distance from the longitudinal axis;
  ii. a vertically oriented, circular first flange section centered about the longitudinal axis and coupled to said disc section, said first flange section including an outer surface located at a fourth radial distance from the longitudinal axis where the fourth radial distance is approximately equal to or slightly shorter than the first radial distance for enabling said first flange section to fit coaxially within the lower section of said enclosure; and
  iii. a horizontally oriented, circular second flange section coupled to and extending outward from said first flange section and having an upper surface for contacting the lower surface of said enclosure.

10. The lighting fixture of claim 9 further including clamping means engaging both said enclosure and said base to bias the upper surface of said second flange section into firm contact with the lower surface of said enclosure.

11. The lighting fixture of claim 10 wherein said second flange section is elevated above said disc section.

12. The lighting fixture of claim 11 wherein said disc section includes a plurality of reinforcing ribs.

13. The lighting fixture of claim 11 wherein said clamping means includes an upper clamping surface and a lower clamping surface and wherein said upper clamping surface engages the base of said enclosure and said lower clamping surface engages said second flange section.

14. The lighting fixture of claim 13 wherein said clamping means includes a C-shaped cross section.

15. The lighting fixture of claim 14 wherein said clamping means is formed as an incomplete circular clamp having first and second ends and includes means coupled to said first and second ends for varying the spacing between said ends.

16. The lighting fixture of claim 11 further including sealing means disposed between the base of said enclosure and the upper surface of said second flange section for forming a watertight seal between said supporting base and the base of said enclosure.

17. The lighting fixture of claim 16 wherein said sealing means includes a circular gasket.

18. The lighting fixture of claim 16 wherein said second flange section commences at the first radial distance and terminates at the second radial distance.

19. The lighting fixture of claim 16 wherein disc section includes an aperture centered about the longitudinal axis.

20. The lighting fixture of claim 19 wherein said disc section includes a plurality of apertures disposed in said disc section symmetrically with respect to said aperture at a radial distance of less than the third radial distance.

21. The lighting fixture of claim 16 wherein said disc section, said first flange section and said second flange section are formed from a single piece of material.

22. The lighting fixture of claim 21 wherein said material includes steel.

23. The lighting fixture of claim 21 wherein a horse shoe bend is formed in said material between said disc section and said second flange section to create said first flange section.

* * * * *